(12) United States Patent
Kumagai

(10) Patent No.: US 9,419,458 B2
(45) Date of Patent: Aug. 16, 2016

(54) STORAGE SYSTEM, ELECTRONIC DEVICE, ELECTRIC VEHICLE AND POWER SYSTEM

(75) Inventor: Eiji Kumagai, Kanagawa (JP)

(73) Assignee: Sony Corporation, Tokyo (JP)

( * ) Notice: Subject to any disclaimer, the term of this patent is extended or adjusted under 35 U.S.C. 154(b) by 203 days.

(21) Appl. No.: 13/990,719

(22) PCT Filed: Oct. 12, 2011

(86) PCT No.: PCT/JP2011/073978
§ 371 (c)(1),
(2), (4) Date: May 30, 2013

(87) PCT Pub. No.: WO2012/077412
PCT Pub. Date: Jun. 14, 2012

(65) Prior Publication Data
US 2013/0249446 A1 Sep. 26, 2013

(30) Foreign Application Priority Data
Dec. 8, 2010 (JP) ................................. 2010-273364

(51) Int. Cl.
*H02J 7/00* (2006.01)
*B60L 11/18* (2006.01)
*H01M 10/44* (2006.01)
(Continued)

(52) U.S. Cl.
CPC ............ *H02J 7/0068* (2013.01); *B60L 11/1805* (2013.01); *B60L 11/1859* (2013.01); *H01M 10/44* (2013.01); *H01M 10/48* (2013.01); *H02J 4/00* (2013.01); *H02J 7/0031* (2013.01); *H01M 2220/20* (2013.01); *H02J 2007/004* (2013.01); *Y02T 10/705* (2013.01); *Y02T 10/7005* (2013.01); *Y10T 307/328* (2015.04)

(58) Field of Classification Search
CPC ..... H02J 7/0068; H02J 2007/004; H02J 4/00; H02J 7/0031; H01M 10/44; H01M 10/48; H01M 2220/20; B60L 11/1805; B60L 11/1859; Y02T 10/7005; Y02T 10/705; Y10T 307/328
USPC .................. 320/101, 120, 134, 136, 166, 167
See application file for complete search history.

(56) References Cited

U.S. PATENT DOCUMENTS

| | | | |
|---|---|---|---|
| 5,397,974 A * | 3/1995 | Tamai et al. ................... | 320/164 |
| 5,493,197 A | 2/1996 | Eguchi et al. | |
| 5,530,336 A * | 6/1996 | Eguchi et al. ................. | 320/118 |

(Continued)

FOREIGN PATENT DOCUMENTS

| | | |
|---|---|---|
| JP | 6-104015 | 4/1994 |
| JP | 6-105458 | 4/1994 |

(Continued)

*Primary Examiner* — Nathaniel Pelton
(74) *Attorney, Agent, or Firm* — K&L Gates LLP

(57) ABSTRACT

Discharge is stopped when a voltage of a battery becomes smaller than a defined value or a remaining capacity of the battery reaches 0, and further, when power to a system cannot be maintained, the system is automatically shut down to be put into a shutdown state. When it is determined that the voltage of the battery or an SOC from a battery monitor 11 is smaller than the defined value, a discharge control switch 22 is turned off. A voltage Vx corresponding to a voltage between terminals T1 and T2 is input to an A/D port of a controller 21 and a value thereof is monitored. When it is determined that the voltage Vx input to the A/D port is smaller than a defined value, the controller 21 turns off a switch circuit 12 to turn off power to the battery monitor 11.

12 Claims, 9 Drawing Sheets

(51) Int. Cl.
*H01M 10/48* (2006.01)
*H02J 4/00* (2006.01)

(56) References Cited

U.S. PATENT DOCUMENTS

| | | | |
|---|---|---|---|
| 5,783,322 A * | 7/1998 | Nagai et al. | 429/7 |
| 6,194,871 B1 * | 2/2001 | Haraguchi et al. | 320/134 |
| 2002/0011820 A1 * | 1/2002 | Suzuki et al. | 320/132 |
| 2010/0171468 A1 * | 7/2010 | Brereton | B60L 11/1816 320/163 |
| 2010/0207581 A1 * | 8/2010 | Sakaue | 320/134 |
| 2010/0253278 A1 * | 10/2010 | Chang et al. | 320/101 |
| 2011/0193532 A1 * | 8/2011 | Iwanaga | B60K 6/445 320/163 |

FOREIGN PATENT DOCUMENTS

| | | |
|---|---|---|
| JP | 6-276696 | 9/1994 |
| JP | 9-140066 | 5/1997 |
| JP | 2001-169463 | 6/2001 |
| WO | WO2010044317 * | 4/2010 |

* cited by examiner

FIG. 5

| NUMBER OF SERIES | RESISTANCE CONNECTION | COMBINED RESISTANCE | ON-VOLTAGE |
|---|---|---|---|
| 1 | r1 | R1 | V1 |
| 2 | r2 | R2 | V2 |
| 3 | r1/r2 | R3 | V3 |
| 4 | r3 | R4 | V4 |
| 5 | r1/r3 | R5 | V5 |
| 6 | r2/r3 | R6 | V6 |
| 7 | r1/r2/r3 | R7 | V7 |
| 8 | r4 | R8 | V8 |
| 9 | r1/r4 | R9 | V9 |
| 10 | r2/r4 | R10 | V10 |
| 11 | r1/r2/r4 | R11 | V11 |
| 12 | r3/r4 | R12 | V12 |

STORAGE SYSTEM, ELECTRONIC DEVICE, ELECTRIC VEHICLE AND POWER SYSTEM

CROSS REFRENCES TO RELATED APPLICATIONS

The present application is a national stage of International Application No. PCT/JP2011/073978 filed on Oct. 12, 2011 and claims priority to Japanese Patent Application No. 2010-273364 filed on Dec. 8, 2010, the disclosure of which is incorporated herein by reference.

BACKGROUND

This disclosure relates to a storage system, an electronic device and an electric vehicle, which utilize power from the storage system, and a power system.

Recently, application of a secondary battery such as a lithium-ion battery has been rapidly expanded to an electric power storage device in which the second battery is combined with a new energy system such as a photovoltaic cell and wind power generation, a vehicle storage battery and the like. In a case in which a great number of storage devices such as unit cells (electric cells, also referred to as cells; simply appropriately referred to as cells in a following description) are used for generating significant power, a configuration in which a plurality of storage modules is connected in series is adopted. In the storage module, a plurality of, for example, four cells are connected in parallel and/or in series to configure a battery block. A great number of battery blocks are stored in an exterior case and the storage module (also referred to as an assembled battery) is configured.

Further, a configuration to connect a plurality of storage modules to each other and provide a control device common to a plurality of storage modules (such configuration is referred to as a battery system) is known. The configuration is such that each storage module includes processing means (microprocessor MPU) and communicates between the MPU and the control device through communication means.

In the battery system, it is required to shut down (or power down) the storage system when a battery voltage becomes equal to or lower than a predetermined voltage or when an SOC (State Of Charge) of a battery unit becomes substantially 0 in order to prevent an over discharge of the battery. When a charging voltage is input, control to detect the input of the charging voltage to return from a shutdown state to a charging state is required in order to return from an off-state to the charging state. It is required to continue supplying the power to a circuit for the control even in the shutdown state. Following Patent Document 1 discloses that, when the over discharge is detected, it is put into the shutdown state and discharge is inhibited by decreasing a current flowing to the circuit in the shutdown state, so that the power may be supplied to the circuit for a long period of time.

CITATION LIST

Patent Documents

Patent Document 1: Japanese Patent Application Laid-Open No. 06-104015

SUMMARY

Problems to be Solved by the Invention

Although countermeasures to decrease the discharging current in the shutdown state are taken in Patent Document 1 described above, it is not possible to set the discharging current to 0. Therefore, when a long period of time passes in the shutdown state, a capacity of the battery decreases and the power to the circuit becomes deficient, so that there is possibility that charge cannot be started from the shutdown state. Further, when the number of batteries such as the storage modules changes, a minimum required charging voltage changes. Recovery from the shutdown state to the charging state in consideration of such a change in the charging voltage is not conventionally performed.

Therefore, an object is to provide the storage system capable of setting the discharging current in the shutdown state to 0 and of recovering from the shutdown state to the charging state in consideration of difference in the number of connected batteries, the electronic device, the electric vehicle, and the power system.

Solution to Problems

In order to solve the above-described problem, the storage system of this disclosure is a storage system, including: a storage unit capable of charging and discharging; positive and negative terminals to which at least one of a power supply and a load is connected; a positive power-supply line arranged between a positive electrode side of the storage unit and the positive terminal; a negative power-supply line arranged between a negative electrode side of the storage unit and the negative terminal; a discharge control switch device inserted into one of the positive power-supply line and the negative power-supply line; a detecting unit that detects at least one of a voltage and a capacity of the storage unit; a controller that controls the discharge control switch device based on detection information from the detecting unit; a control power-supply unit connected to the positive and negative power-supply lines to supply a voltage corresponding to a voltage between the positive and negative terminals to the controller; and a control switch that turns off the control power-supply unit according to an instruction from the controller, wherein the controller turns off the discharge control switch device when the detecting unit detects that at least one of the voltage and the capacity of the storage unit is smaller than a predetermined value at the time of discharge when the discharge control switch device is turned on, and thereafter, the controller turns off power to the detecting unit and the control switch turns off the control power-supply unit, thereby stopping the discharge of the storage unit.

According to such a configuration, it is possible to automatically stop the discharge when the storage unit stops acting. The power to the detecting unit and the controller is turned off after the stop, so that the power is not required in the shutdown state and possibility that the storage unit discharges and it is not possible to start the charge by detecting the input of the charging voltage may be resolved.

The storage system of this disclosure is a storage system, including: a storage unit capable of charging and discharging; positive and negative terminals to which at least one of a power supply and a load is connected; a positive power-supply line arranged between a positive electrode side of the storage unit and the positive terminal; a negative power-supply line arranged between a negative electrode side of the storage unit and the negative terminal; a controller; a control power-supply unit connected to the positive and negative power-supply lines to supply a voltage corresponding to a voltage between the positive and negative terminals to the controller; a comparing unit that is operated by a power-supply voltage formed of the voltage between the positive and negative terminals and generates an output by comparing the voltage corresponding to the voltage between the positive and negative terminals input to the comparing unit with a reference voltage; and a control switch that turns off the control power-supply unit according to an instruction from the controller and turns on the control power-supply unit according to an instruction from the comparing unit, wherein the control switch turns on the control power-supply unit according to the instruction from the comparing unit when the voltage input to the comparing unit becomes larger than the reference voltage in an off-state in which charge and discharge are not performed, and the controller turns on power to a detecting unit, thereby starting the charge of the storage unit.

According to such a configuration, it is possible to detect the input of the charging voltage to start charging after the discharge is stopped. Since the power-supply voltage of the comparing unit is formed of the output voltage, the comparing unit does not require the power supply in the shutdown state. Further, it is possible to detect the input of the charging voltage corresponding to the number of connected storage devices by changing one of the input voltage of the comparing unit and the reference voltage according to the number of connected storage devices of the storage unit.

The storage system of this disclosure is a storage system, including: a storage unit capable of charging and discharging; positive and negative terminals to which at least one of a power supply and a load is connected; a positive power-supply line arranged between a positive electrode side of the storage unit and the positive terminal; a negative power-supply line arranged between a negative electrode side of the storage unit and the negative terminal; a discharge control switch device inserted into one of the positive power-supply line and the negative power-supply line; a detecting unit that detects at least one of a voltage and a capacity of the storage unit; a controller that controls the discharge control switch device based on detection information from the detecting unit; a control power-supply unit connected to the positive and negative power-supply lines to supply a voltage corresponding to a voltage between the positive and negative terminals to the controller; a comparing unit that is operated by a power-supply voltage formed of the voltage between the positive and negative terminals and generates an output by comparing the voltage corresponding to the voltage between the positive and negative terminals input to the comparing unit with a reference voltage; and a control switch that turns off the control power-supply unit according to an instruction from the controller and turns on the control power-supply unit according to an instruction from the comparing unit, wherein the controller turns off the discharge control switch device when the detecting unit detects that at least one of the voltage and the capacity of the storage unit is smaller than a predetermined value at the time of discharge when the discharge control switch device is turned on, thereafter, the controller turns off power to the detecting unit and the control switch turns off the control power-support unit, thereby stopping the discharge of the storage unit, the control switch turns on the control power-supply unit according to the instruction from the comparing unit when the voltage input to the comparing unit becomes larger than the reference voltage in an off-state in which charge and discharge are not performed, and the controller turns on the power to the detecting unit to start the charge of the storage unit.

This disclosure is the storage system, which supplies the electronic device connected to the above-described storage system with the power.

This disclosure is the electronic device supplied with the power from the above-described storage system.

This disclosure is the electric vehicle including a conversion device that is supplied with the power from the above-described storage system and converts the same to a drive force of the vehicle, and a control device that performs information processing regarding vehicle control based on information regarding the storage system.

This disclosure is the power system provided with a power information transmitting/receiving unit that transmits/receives a signal to/from another device through a network, and the power system performs charge/discharge control of the above-described storage system based on information received by the transmitting/receiving unit.

This disclosure is the power system, which is supplied with the power from the above-described storage system or supplies the power from a power generating device or a power network to the storage system.

Effects of the Invention

When the storage unit stops acting, the discharge may be automatically stopped. The power to the detecting unit and the controller is turned off after the stop, so that the power is not required in the shutdown state and possibility that the storage unit discharges and it is not possible to start the charge by detecting the input of the charging voltage may be resolved. Further, it is possible to detect the input of the charging voltage to start charging after the discharge is stopped. Further, it is possible to detect the input of the charging voltage corresponding to the number of connected storage devices by changing one of the input voltage of the comparing unit and the reference voltage according to the number of connected storage devices of the storage unit.

Additional features and advantages are described herein, and will be apparent from the following Detailed Description and the figures.

BRIEF DESCRIPTION OF THE FIGURES

FIG. 5 is a schematic diagram used for illustrating FIG. 4.

FIG. 7 is a flowchart for illustrating operation when the power is turned on.

DETAILED DESCRIPTION

Although an embodiment described hereinafter is a preferred specific example of the present invention with technically preferred various limitations, the scope of the present invention is not limited to the embodiment unless it is especially described to limit the invention in a following description.

<Outline of Storage System>

In a case in which a great number of storage devices such as battery cells are used for generating significant power, a configuration in which a plurality of storage units (hereinafter, referred to as storage modules) is connected to each other and a control device common to the plurality of storage modules is provided is adopted. Such configuration is referred to as a battery system. The storage module is a unit obtained by combining a plurality of battery cells such as lithium-ion secondary batteries and a controller.

Figure 1:
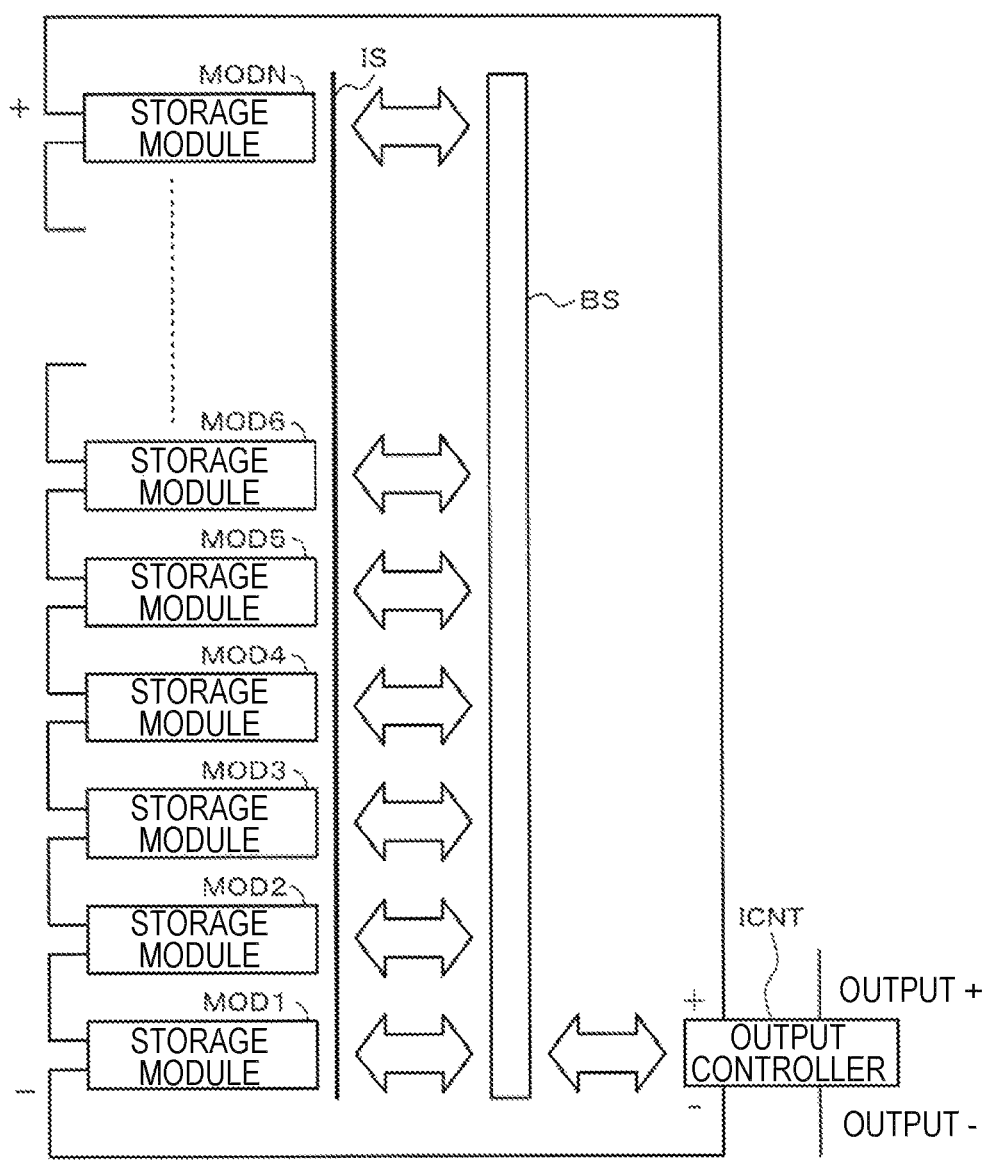
FIG. 1 is a block diagram of an example of a storage system.

As illustrated in FIG. 1, N storage modules MOD1 to MODN are connected in series. The storage modules MOD1 to MODN are connected to an interface bus BS through an insulating unit IS. An insulating interface IF is provided on each storage module MOD for connecting a module controller CNT to an external interface bus BS. The insulating interface IF serves to insulate the storage module MOD from the interface bus BS. Further, each module controller is connected to a control device of all (hereinafter, appropriately referred to as an output controller) ICNT and the output controller ICNT performs management of charge and discharge and management to inhibit deterioration and the like.

A serial interface is used as a bus in the storage module and the bus BS for connecting the storage modules MOD1 to MODN and the output controller ICNT. An SM bus (System Management Bus) and the like is specifically used as the serial interface. For example, an I2C bus may be used. The I2C bus is a synchronous serial communication for communicating by using two signal lines, which are an SCL (serial clock) and a bidirectional SDA (serial data).

The controller CNT of each storage module MOD and the output controller ICNT communicate with each other. That is, the output controller ICNT receives information of an inner state of each storage module and a charging process and a discharging process of each storage module are managed. The output controller ICNT supplies an output of a series connection of the N storage modules to a load. The storage modules may be connected to each other. An output voltage of one storage module is set to 80 V, for example, and the output voltage of (80 V to 400 V) is generated from the output controller ICNT in a case in which N=1 to N=5.

Figure 2:
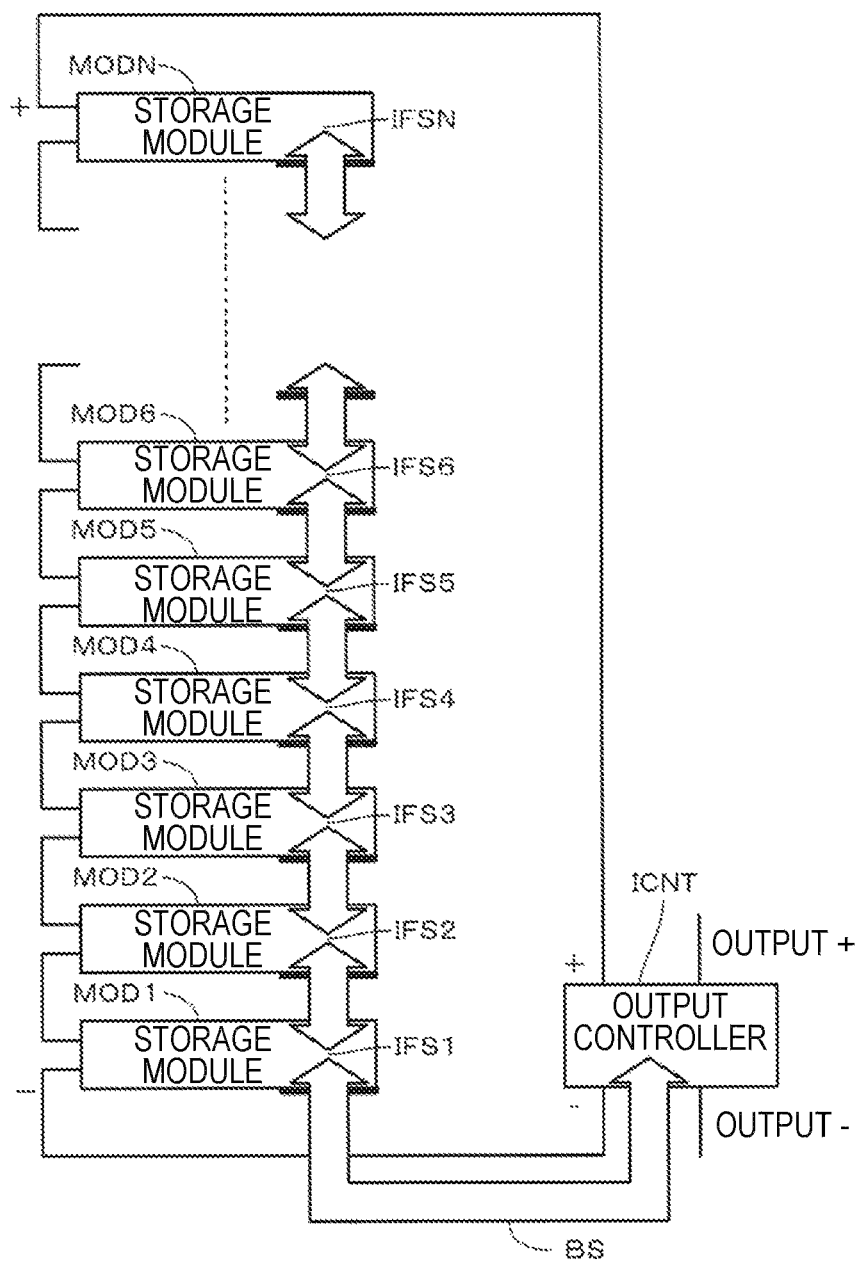
FIG. 2 is a block diagram of another example of the storage system.

FIG. 2 illustrates another example of a storage system. In another example, the N storage modules MOD1 to MODN are connected in series. Each of the storage modules MOD1 to MODN includes an insulating interface for insulating the storage modules from each other. The module controller of each storage module communicates with an upper or lower storage module or with an external output controller through photo couplers IFS1 to IFSN as the insulating interfaces.

The output controller ICNT is connected to the lowest storage module MOD1. The output controller ICNT controls an entire battery system. The output controller ICNT receives the information of the inner state of each storage module and supplies and blocks a charging current and a discharging current to and from each storage module, thereby controlling the charge and discharge of each storage module.

<Storage System>

Figure 3:
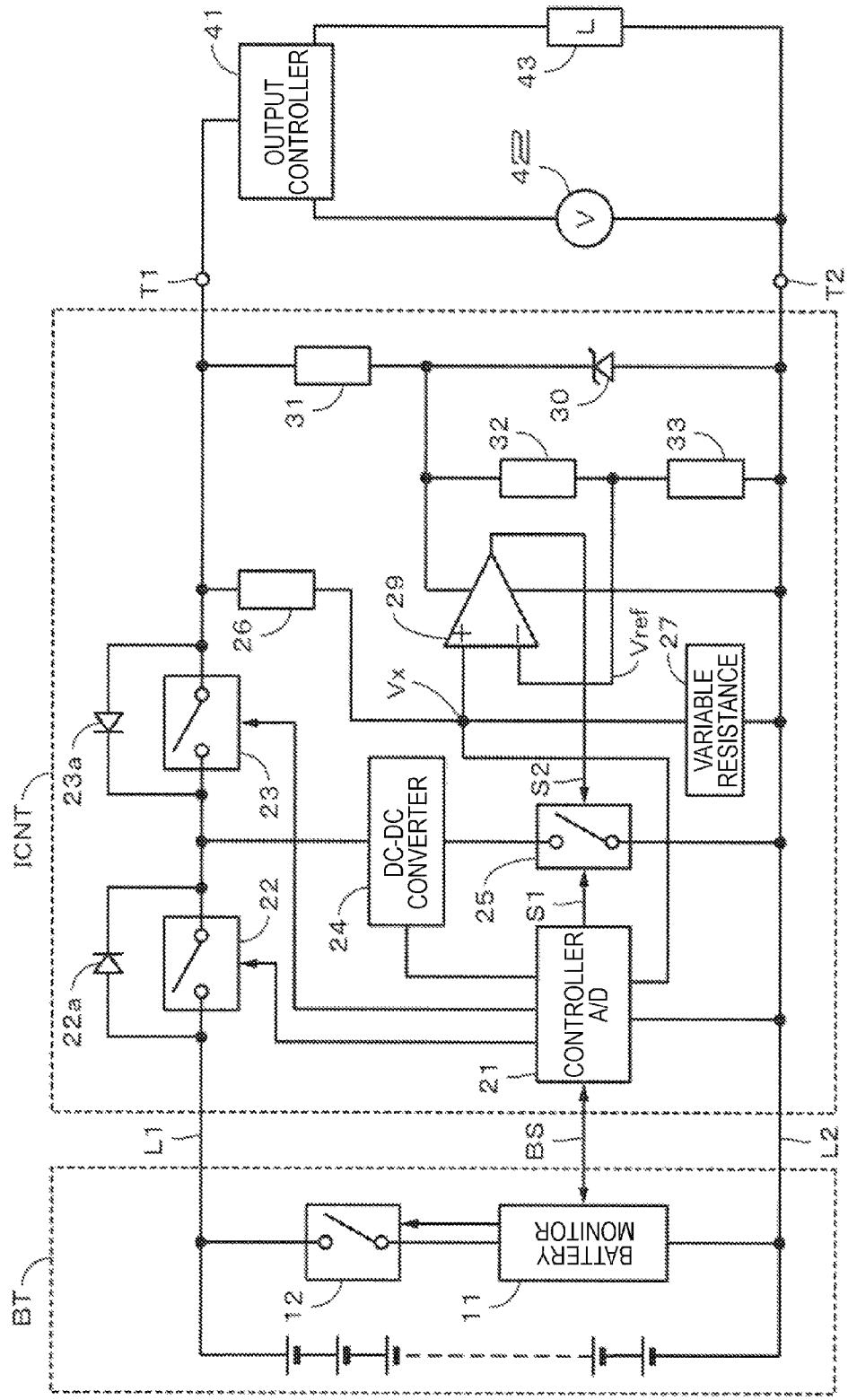
FIG. 3 is a block diagram illustrating a specific configuration of the storage system.

The battery system is described with reference to FIG. 3. A battery unit BT is composed of one or more of the above-described storage modules, for example. The number of batteries connected in series is appropriately set according to application and the like. The battery unit BT is provided with a battery monitor 11 as a detecting unit, which detects a voltage of each battery and further calculates an SOC (State Of Charge). The output voltage of the battery unit BT is supplied through a switch circuit 12 as a power-supply voltage of the battery monitor 11. Meanwhile, although the switch circuit 12 is actually provided in the battery monitor 11, this is separately illustrated from the battery monitor 11 for convenience of description.

A controller 21 of the output controller ICNT is notified that the voltage of each battery reaches a set upper limit value or a set lower limit value and notified of the SOC and the like through the interface BS. The controller 21 is a microcomputer composed of a CPU (Central Processing Unit) and the like, for example. The controller 21 has a configuration in which a ROM (Read Only Memory), a RAM (Random Access Memory) and the like are connected to the CPU. The controller PR manages the battery unit BT by executing a program stored in the ROM.

A positive power-supply line L1 is arranged between a positive electrode side of the battery of the battery unit BT and a positive terminal T1 and a negative power-supply line L2 is arranged between a negative electrode side of the battery and a negative terminal T2. A power supply 42 or a load 43 is connected to the terminals T1 and T2 through an output controller 41. The power supply 42 charges the battery of the battery unit BT and power of the battery of the battery unit BT is supplied to the load 43.

The power supply 42 is a direct-current power supply formed by rectifying alternating-current power of a power supply network (commercial power supply) or a power generating device (solar panel and wind power generating device) utilizing renewable energy. The load 43 is a household electronic device, for example, and in general, direct-current power of the storage system is converted to the alternating-current power to be supplied to the electronic device. The output controller 41 controls to select from the power supply 42 and the load 43 to be connected to the terminals T1 and T2.

For example, when the solar panel is used as the power supply 42, a power generation amount thereof varies according to weather, a time period and the like. Therefore, in the daytime in which the power generation amount of the solar panel is large, the battery of the battery unit BT of the storage system is charged with an output from the solar panel and the solar panel output is supplied to the load 43. Then, the solar panel does not generate the power at night, so that the power is supplied from the battery of the battery unit BT of the storage system to the load 43. The output controller 41 performs such control. However, this control is merely a simple example and more complex control is performed in consideration of a power consumption of the load 43 or by combining usage of the commercial power supply. When such power supply 42 is used, it is required that the storage system in a shutdown state start charging when charging power is supplied to the terminals T1 and T2.

A charge control switch 22 and a discharge control switch 23 are inserted into one of the positive power-supply line L1 and the negative power-supply line L2, for example, the positive power-supply line L1. A MOSFET (Metal Oxide Semiconductor Field Effect Transistor), for example, may be used as the switches. A diode 22a is connected so as to be in parallel with the charge control switch 22 in a forward direction with respect to the discharging current. A diode 23a is connected so as to be in parallel with the discharge control switch 23 in the forward direction with respect to the charging current.

Each of the charge control switch 22 and the discharge control switch 23 is turned on or off by the controller 21. That is, at the time of the charge, the charge control switch 22 is turned on and the discharge control switch 23 is turned off, then the charging current is supplied to the battery of the battery unit BT through the diode 23a and the charge control switch 22. At the time of the discharge, the charge control switch 22 is turned off and the discharge control switch 23 is turned on, then the discharging current is supplied to the load through the diode 22a and the discharge control switch 23. Meanwhile, the charge control switch 22 and the discharge control switch 23 may also be inserted into the negative power-supply line L2.

A power-supply voltage is supplied from a DC-DC converter 24 as a power-supply unit to the controller 21. An input voltage is supplied from the power-supply line L1 between the charge control switch 22 and the discharge control switch 23 to the DC-DC converter 24. Therefore, not only the voltage from the battery unit BT but also the voltage from the power supply 42 connected to the terminals T1 and T2 is input to the DC-DC converter 24. A negative side of the DC-DC converter 24 is connected to the negative power-supply line L2 through a control switch 25. The control switch 25 allows the DC-DC converter 24 to operate in an on-state, and this does not allow the DC-DC converter 24 to operate in an off-state. The DC-DC converter 24 forms the power-supply voltage of +12 V from the input voltage of +80 V to +400 V, for example, and the formed power-supply voltage is supplied to the controller 21.

The control switch 25 is turned off by a switch control signal S1 output from the controller 21. When the controller 21 is notified that the voltage of any battery reaches the set lower limit value or that the SOC reaches a value set in advance from the battery monitor 11, this outputs a control signal to turn off the discharge control switch 23. For example, when a remaining capacity reaches 0%, the discharge control switch 23 is turned off. This operation prevents an over discharge of the battery.

Further, when the voltage between the terminals T1 and T2 is supplied to the controller 21 and the controller 21 determines that the voltage is smaller than a defined value set in advance (threshold), this outputs a control signal to turn off the switch circuit 12 of the battery monitor 11 and the switch control signal S1. A series circuit of a resistance 26 and a variable resistance 27 is inserted between the terminals T1 and T2. A resistance value of the variable resistance 27 is set by a switch unit according to the number of connected batteries of the battery unit BT as described later. The switch unit is set by a user.

A voltage Vx generated on a connecting point of the resistance 26 and the variable resistance 27 is supplied to an A/D (analog/digital) port of the controller 21 to be converted to a digital signal. A fact that the voltage Vx is smaller than the defined value means that the DC-DC converter 24 cannot form the power-supply voltage required for the controller 21 to operate. When the voltage between the terminals T1 and T2 decreases to such a state, the switch circuit 12 is turned off to be shut down. In the shutdown state, the current does not flow to the battery monitor 11, the controller 21, and the DC-DC converter 24.

In the shutdown state, when the voltage required for the charge is applied from the power supply 42 to the terminals T1 and T2, the charge is started. A comparator 29 is provided as a comparing unit for detecting application of the voltage required for the charge to the terminals T1 and T2. The voltage Vx generated on the connecting point of the resistance 26 and the variable resistance 27 is supplied to a positive input terminal of the comparator 29. The power-supply voltage of +15 V, for example, formed by a Zener diode 30 is supplied to a positive power-supply terminal of the comparator 29 and a negative power-supply terminal thereof is connected to the power-supply line L2. An anode of the Zener diode 30 is connected to the power-supply line L2 and a cathode thereof is connected to the power-supply line L1 through a resistance 31.

Further, the power-supply voltage to the comparator 29 is divided by resistances 32 and 33 to form a reference voltage Vref. The reference voltage Vref is supplied to a negative input terminal of the comparator 29. The comparator 29 generates a high-level comparative output when a relationship between the input two voltages satisfies (Vx>Vref) and generates a low-level comparative output in other cases. The comparative output of the comparator 29 is supplied to the control switch 25 as a switch control signal S2. The control switch 25 is turned on when the switch control signal S2 is a high-level signal.

An example of the variable resistance 27 is described with reference to FIGS. 4 and 5. Meanwhile, although not illustrated in FIG. 4, the switch control signal S2 output from the comparator 29 is supplied to the control switch 25 as in the configuration in FIG. 3. For example, a series circuit of a resistance r1 and a switch S1, a series circuit of a resistance r2 and a switch S2, a series circuit of a resistance r3 and a switch S3, and a series circuit of a resistance r4 and a switch S4 are connected in parallel. A switch unit 28 composed of the switches S1 to S4 is configured such that the user may set by operation. A relationship among the resistances r1 to r4 is set as (r1=4r4, r2=3r4, and r3=2r4), for example.

As illustrated in FIG. 5, the switch unit 28 is set according to the number (1 to 12) of connected battery modules (composed of series connection of a plurality of cells) of the battery unit BT and the connection of the resistances r1 to r4 is determined by the setting of the switch unit 28. For example, when the number of series connection is 1, only the switch S1 is turned on and a combined resistance of the variable resistance 27 becomes R1 (=r1). Then, (Vx>Vref) is satisfied and an on-voltage V1 required for the output from the comparator 29 to be the high-level output is determined. The on-voltage V1 is the voltage applied to the series connection of the resistance 26 and the variable resistance 27 by the power supply 42.

For example, when the number of series connection is 7, the switches S1, S2, and S3 are turned on and the combined resistance of the variable resistance 27 becomes R7 (=r1/r2/r3 (/ represents parallel connection)). An on-voltage V7 for the output from the comparator 29 to be the high-level output is determined. Further, when the number of connected units is 12, the switches S3 and S4 are turned on and the combined resistance of the variable resistance 27 becomes R12 (=r3/r4). An on-voltage V12 for the output from the comparator 29 to be the high-level output is determined.

The larger the number of battery modules connected in series, the higher a charging voltage required for charging the battery unit BT, so that the variable resistance 27 is provided. As described above, the resistance value of the variable resistance 27 is set by the setting of the switch unit 28. That is, a relationship of the combined resistances (R1>R2>R3>R4>R5>R6>R7>R8>R9>R10>R11>R12) is satisfied and a relationship of the on-voltages (V1<V2<V3<V4<V5<V6<V7<V8<V9<V10<V11<V12) is satisfied. For example, while the on-voltage V1 is approximately 45 V when the number of series connection is 1, which is the minimum number, the on-voltage V12 is approximately 670 V when the number of series connection is 12, which is the maximum number.

Figure 4:
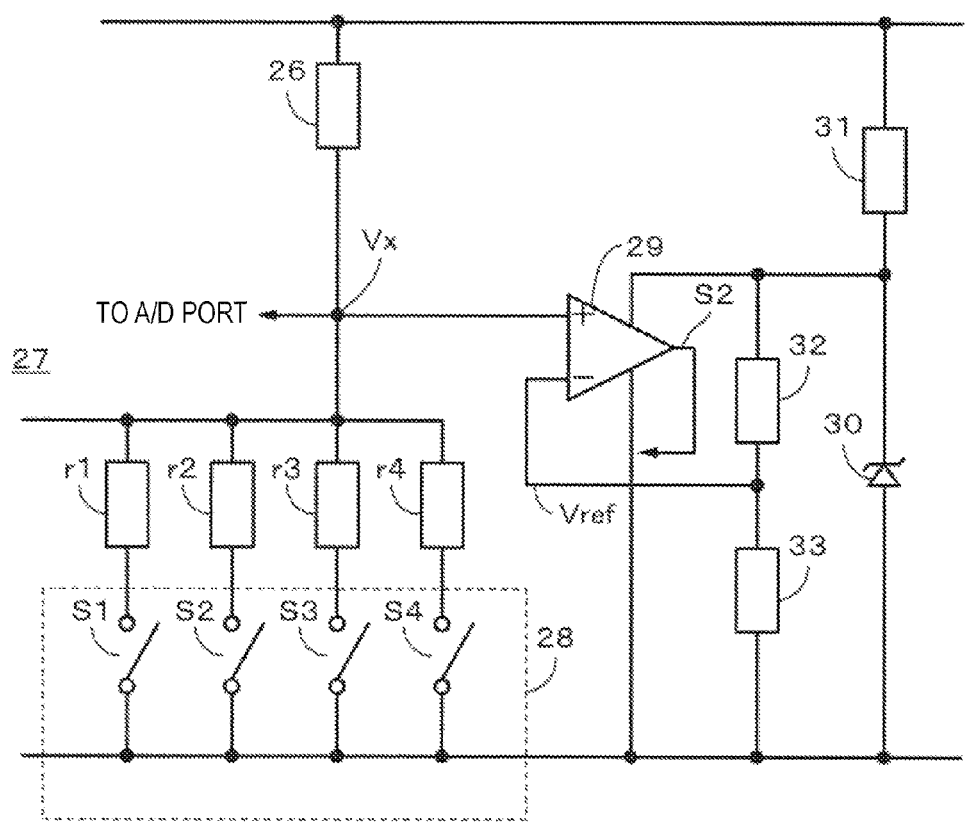
FIG. 4 is a block diagram of a part of FIG. 3 in more detail.

Meanwhile, although not illustrated in FIG. 4, the Zener diode is connected so as to be in parallel with the variable resistance 27 and the voltage supplied to the A/D port of the controller 21 is made equal to or lower than a Zener voltage of the Zener diode.

<Shutdown Operation>

Figure 6:
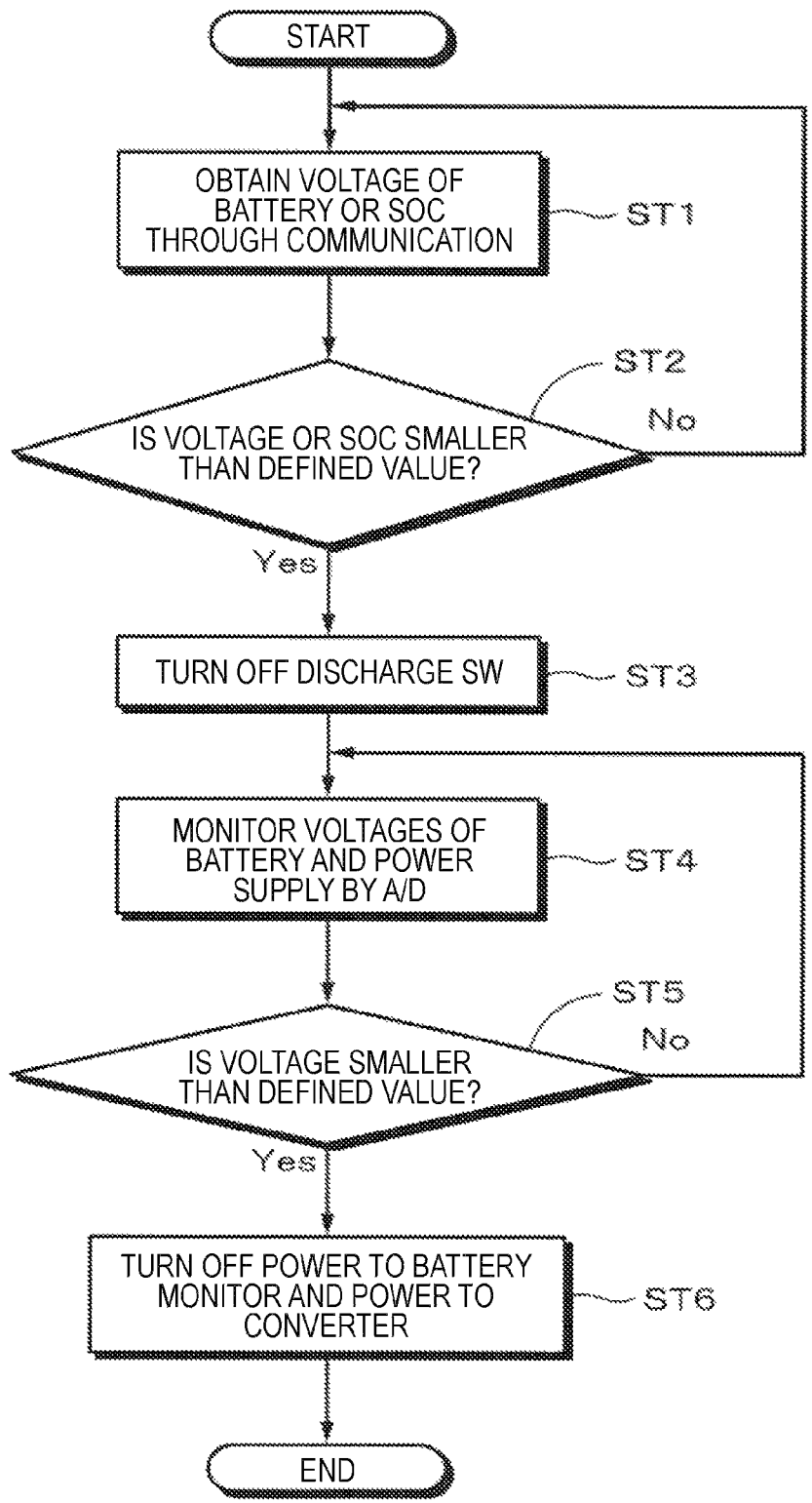
FIG. 6 is a flowchart for illustrating operation when power is shut down.

Shutdown operation to stop the discharge and turn off the power to the controller 21 and the battery monitor 11 is described with reference to a flowchart in FIG. 6. The operation illustrated in the flowchart is performed by control of the controller 21 according to the program stored in the ROM and the like in advance.

At first step ST1, the voltage of each battery or the SOC of the battery unit BT is obtained through the interface bus BS from the battery monitor 11 through communication. It is determined whether the obtained voltage or SOC is smaller than the defined value (threshold) at step ST2. When it is determined that the obtained voltage or SOC is smaller than the defined value, the discharge control switch 23 is turned off. According to this, the discharge is stopped. Meanwhile, the charge control switch 22 is turned off at the time of the discharge.

The voltage Vx corresponding to the voltage between the terminals T1 and T2 is input to the A/D port of the controller 21 and a value thereof is monitored at step ST4. As the voltage Vx, not only the voltage of the battery unit BT but also the voltage of the power supply 42 is monitored when the voltage from the power supply 42 is input. At step ST5, it is determined whether the voltage Vx input to the A/D port is smaller than the defined value.

When it is determined that the voltage Vx is smaller than the defined value, the controller 21 turns off the switch circuit 12 to turn off the power to the battery monitor 11 at step ST6. Together with this, the control switch 25 is turned off by the switch control signal S1. As a result, the operation of the DC-DC converter 24 stops. It is shut down in this manner. In the shutdown state, the current to the battery monitor 11, the controller 21, and the DC-DC converter 24 does not flow and there is no power consumption.

<Power-On Operation>

Figure 7:
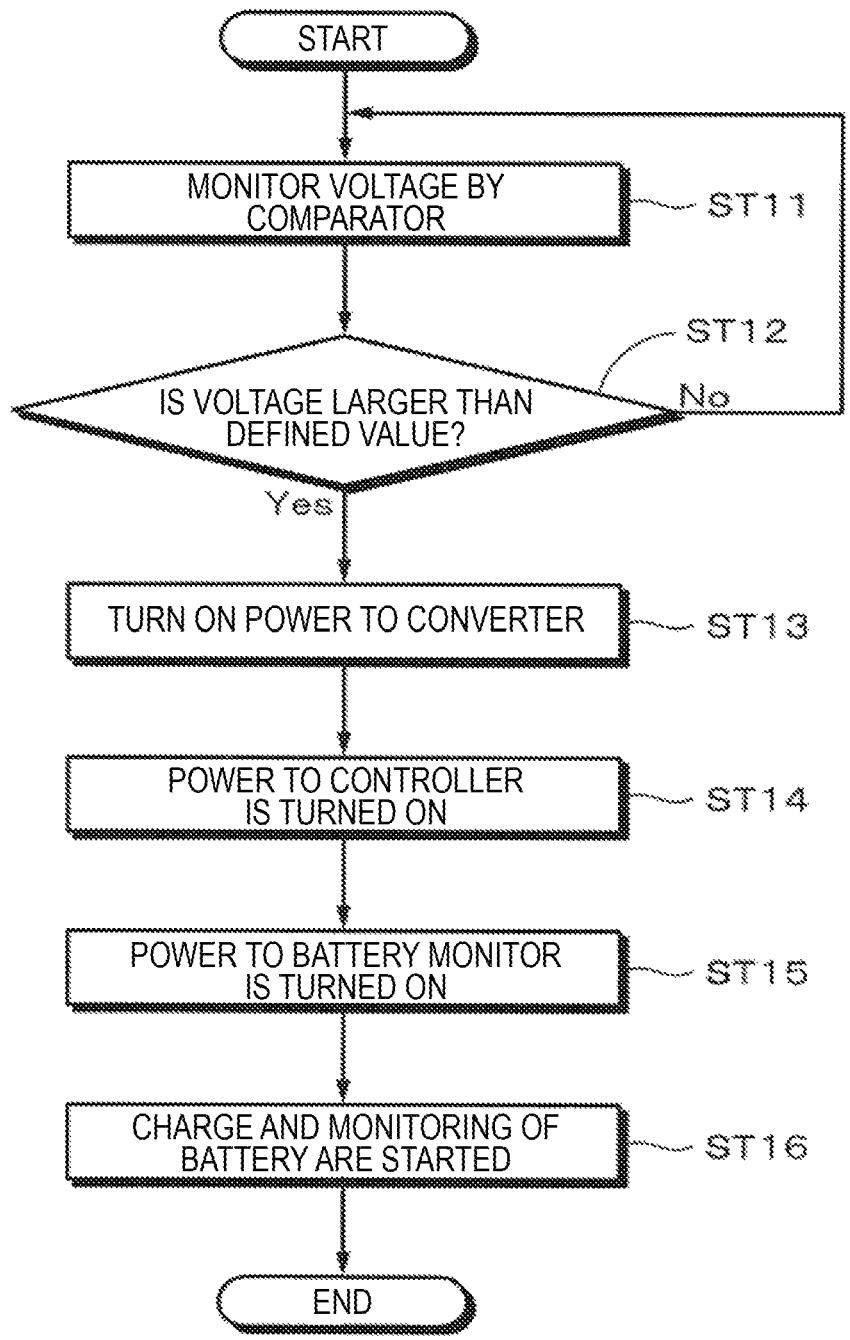

Control of operation to start charging from the shutdown state is described with reference to FIG. 7. In the shutdown state, the voltage applied between the terminals T1 and T2 is monitored by the comparator 29 (step ST11). At step ST12, it is determined whether the voltage is larger than the defined value. When the voltage is larger than the defined value, the comparator 29 generates the high-level output. The resistance value of the variable resistance 27 varies according to the number of battery modules connected in series of the battery unit BT and even if the reference voltage Vref is constant, when the on-voltage according to the number of series connection is applied to the terminals T1 and T2, the output from the comparator 29 becomes the high-level output.

When it is determined that the voltage is larger than the defined value at step ST12, the control switch 25 is turned on by the output from the comparator 29 (switch control signal S2) at step ST13. As a result, the power to the DC-DC converter 24 is turned on and the power is supplied to the controller 21 at step ST14. By the control of the controller 21, the charge control switch 22 is turned on and the switch circuit 12 is turned on, then the power to the battery monitor 11 is turned on (step ST15). Then, as described at step ST16, the charge to the battery of the battery unit BT is started and the voltage of the battery and the SOC of the battery unit BT are started to be monitored.

According to the above-described disclosure, the discharge is stopped when the voltage of the battery becomes smaller than the defined value or the remaining capacity of the battery reaches 0 (or becomes extremely small), and further, when the power to the system cannot be maintained, the system is automatically shut down to be put into the shutdown state. Further, when the power capable of charging the battery is input, the power to the system is automatically turned on and the battery is monitored. Therefore, it is possible to prevent the deterioration of the battery due to the over discharge and perform the operation of the system only when battery power remains. Further, it is possible to detect the input of the power to start charging even in the shutdown state.

The lithium-ion secondary battery is used as the storage device in the description above. However, it is also possible to use a secondary battery other than the lithium-ion secondary battery. Further, it is also possible to use the storage device other than the secondary battery such as an electric double layer capacitor.

This disclosure is the storage system, which supplies the power to the electronic device connected to the above-described storage system.

This disclosure is the electronic device supplied with the power from the above-described storage system.

This disclosure is the power system provided with a power information transmitting/receiving unit to transmit/receive the signal to/from another device through a network, which performs charge/discharge control of the above-described storage system based on the information received by the transmitting/receiving unit.

This disclosure is the power system, which is supplied with the power from the above-described storage system or supplies the power from the power generating device or a power network to the storage system.

The electronic device and the power system are carried out as a home power supply system, for example. Further, this is carried out as a system to efficiently supply the power in cooperation with an external power supply network.

Further, this disclosure is an electric vehicle including a conversion device, which is supplied with the power from the above-described storage system and converts the same to a drive force of the vehicle, and a control device, which performs information processing regarding vehicle control based on information regarding the storage system.

<Home Storage System as Application>

Figure 8:
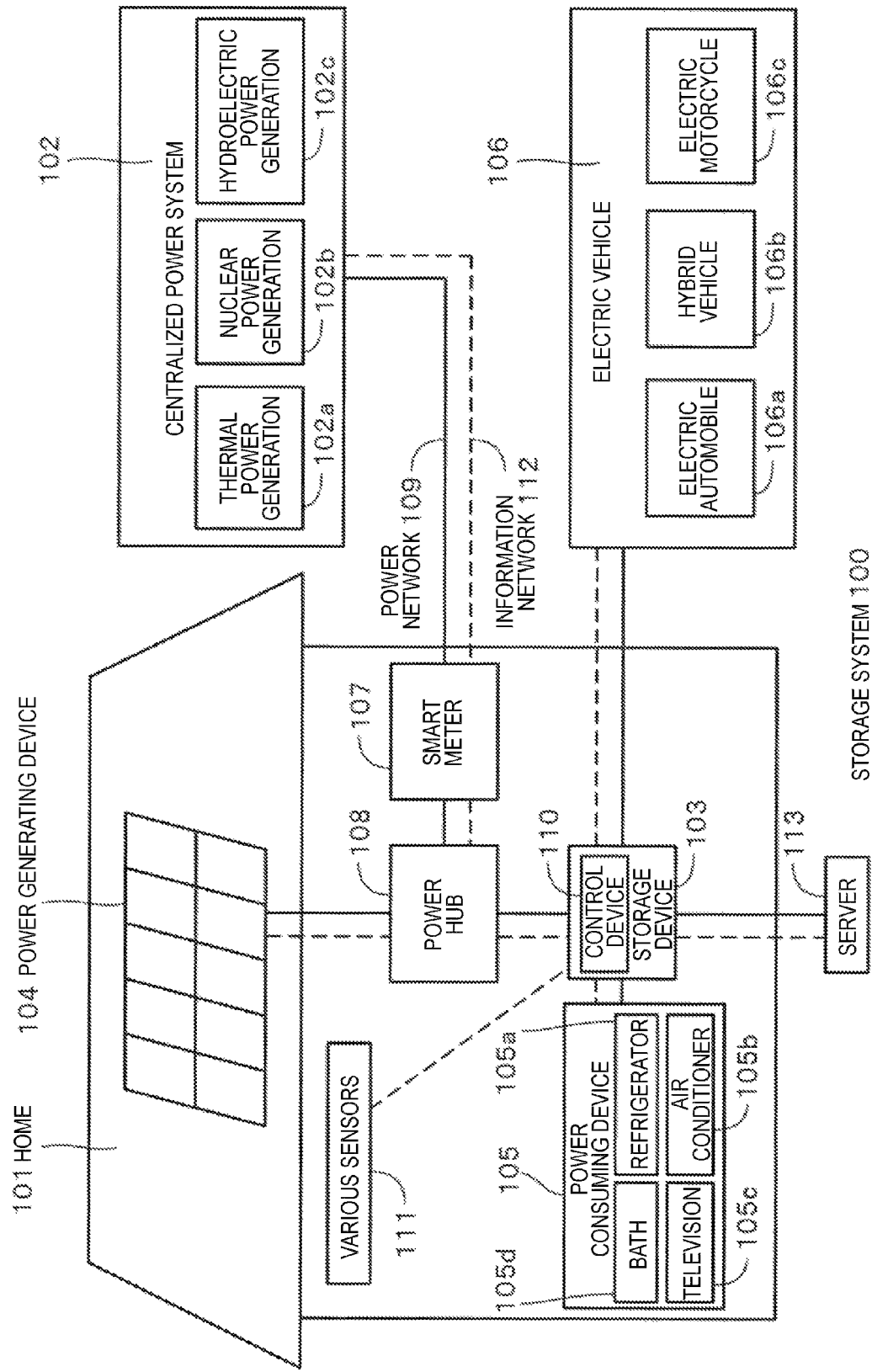
FIG. 8 is a block diagram illustrating an application of the storage system.

An example of applying this disclosure to a home storage system is described with reference to FIG. 8. For example, in a storage system 100 for a home 101, the power is supplied from a centralized power system 102 such as thermal power generation 102*a*, nuclear power generation 102*b*, and hydro-electric power generation 102*c* through a power network 109, an information network 112, a smart meter 107, a power hub 108 and the like to a storage device 103. Together with this, the power is supplied from a standalone power supply such as a household power generating device 104 to the storage device 103. The power supplied to the storage device 103 is stored. The power used in the home 101 is supplied by using the storage device 103. The similar storage system may be used not only in the home 101 but also in a building.

The home 101 is provided with the power generating device 104, a power consuming device 105, the storage device 103, a control device 110 for controlling each device, the smart meter 107, and a sensor 111 for obtaining various pieces of information. Each device is connected by the power network 109 and the information network 112. A photovoltaic cell, a fuel cell and the like are used as the power generating device 104 and the generated power is supplied to the power consuming device 105 and/or the storage device 103. The power consuming device 105 is a refrigerator 105*a*, an air conditioner 105*b*, a television receiving set 105*c*, a bath 105*d* and the like. Further, the power consuming device 105 includes an electric vehicle 106. The electric vehicle 106 is an electric automobile 106*a*, a hybrid vehicle 106*b*, and an electric motorcycle 106*c*.

The storage system of the above-described disclosure is applied to the storage device 103. The storage device 103 is composed of the secondary battery or a capacitor. For example, this is composed of the lithium-ion battery. The lithium-ion battery may be a stationary type or may be used by the electric vehicle 106. The smart meter 107 has a function to measure a used amount of commercial power and transmit the measured used amount to a power company. The power network 109 may be any one of direct-current power feeding, alternating-current power feeding, and non-contact power feeding or may be obtained by combining a plurality of them.

The various sensors 111 include a motion sensor, an illuminance sensor, an object detecting sensor, a power consumption sensor, a vibration sensor, a contact sensor, a temperature sensor, an infrared sensor and the like, for example. The information obtained by the various sensors 111 is transmitted to the control device 110. It is possible to figure out a weather condition, a human condition and the like by the information from the sensor 111 and to automatically control the power consuming device 105, thereby minimizing energy consumption. Further, the control device 110 may transmit the information regarding the home 101 to an external power company and the like through the Internet.

The power hub 108 performs a process such as branching of a power line, direct current-alternating current conversion and the like. A communication system of the information network 112 connected to the control device 110 includes a method of using a communication interface such as a UART (Universal Asynchronous Receiver-Transceiver) and a method of utilizing a sensor network in accordance with a wireless communication standard such as Bluetooth, ZigBee, and Wi-Fi. The Bluetooth system is applied to multimedia communication and is capable of performing one-to-many communication. The ZigBee uses a physical layer of IEEE (Institute of Electrical and Electronics Engineers) 802.15.4. The IEEE 802.15.4 is a name of a short-range wireless network standard referred to as a PAN (Personal Area Network) or a W (Wireless) PAN.

The control device 110 is connected to an external server 113. The server 113 may be managed by any one of the home 101, the power company, and a service provider. The information transmitted/received by the server 113 is power consumption information, life pattern information, a power charge, weather information, natural disaster information, and information regarding power trade. The information may be transmitted/received from a household power consuming device (such as the television receiving set) or may be transmitted/received from a device outside the home (such as a mobile phone). The information may also be displayed on a device having a display function such as the television receiving set, the mobile phone, and a PDA (Personal Digital Assistant).

The control device 110, which controls each unit, is composed of the CPU (Central Processing Unit), the RAM (Random Access Memory), the ROM (Read Only Memory) and the like and is stored in the storage device 103 in this example. The control device 110 is connected to the storage device 103, the household power generating device 104, the power consuming device 105, the various sensors 111, and the server 113 through the information network 112 and has a function to adjust the used amount of the commercial power and the power generating amount, for example. Meanwhile, in addition to this, this may also has a function to carry out the power trade in a power market and the like.

As described above, not only the power of the centralized power system 102 such as the thermal power 102a, the nuclear power 102b, and the hydroelectric power 102c but also the generated power of the household power generating device 104 (photovoltaic power generation and wind power generation) may be stored in the storage device 103. Therefore, even when the generated power of the household power generating device 104 varies, it is possible to control to make an amount of power to be transmitted to outside constant or to discharge the power as needed. For example, it is also possible to store the power obtained by the photovoltaic power generation in the storage device 103 and store inexpensive late-night power in the storage device 103 at night, then discharge the power stored in the storage device 103 to use in the daytime when the power charge is expensive.

Meanwhile, although an example in which the control device 110 is stored in the storage device 103 is described in this example, this may be stored in the smart meter 107 or may be a standalone device. Further, the storage system 100 may be used for a plurality of homes in collective housing or may be used for a plurality of single-family homes.

<Storage System in Vehicle as Application>

Figure 9:
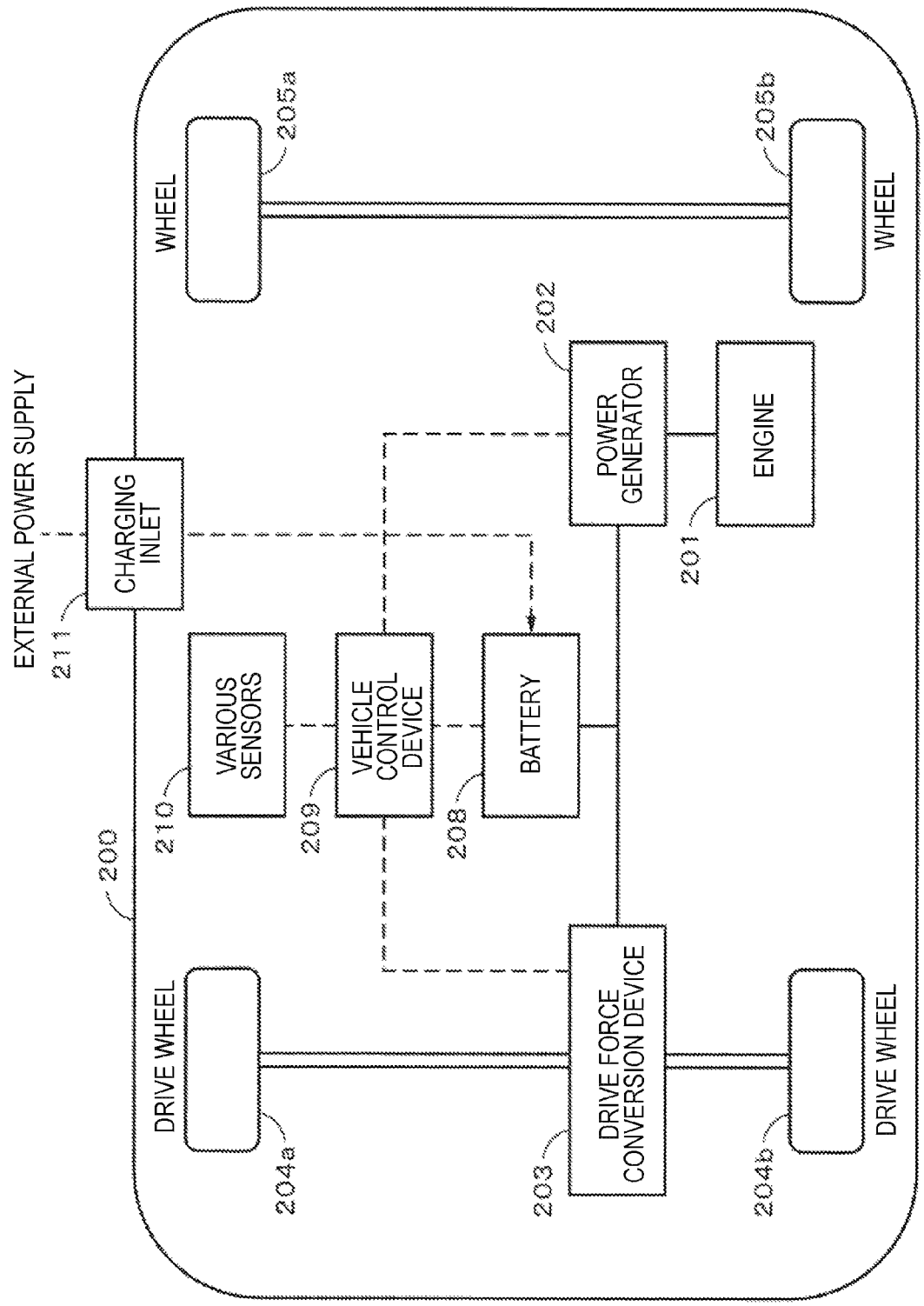
FIG. 9 is a block diagram illustrating an application of the storage system.

An example of applying this disclosure to the storage system for vehicle is described with reference to FIG. 9. An example of a configuration of the hybrid vehicle to which a series hybrid system to which this disclosure is applied is adopted is schematically illustrated in FIG. 9. The series hybrid system is a vehicle, which runs by a power/drive force conversion device by using the power generated by a power generator driven by an engine or the power temporarily stored in a battery.

A hybrid vehicle 200 is equipped with an engine 201, a power generator 202, a power/drive force conversion device 203, drive wheels 204a and 204b, wheels 205a and 205b, a battery 208, a vehicle control device 209, various sensors 210, and a charging inlet 211. The storage system of the above-described disclosure is applied to the battery 208.

The hybrid vehicle 200 runs with the power/drive force conversion device 203 as a power source. An example of the power/drive force conversion device 203 is a motor. The power/drive force conversion device 203 operates by the power of the battery 208 and a rotation force of the power/drive force conversion device 203 is transmitted to the drive wheels 204a and 204b. Meanwhile, an alternating-current motor and a direct-current motor may be applied as the power/drive force conversion device 203 by using direct current-alternating current (DC-AC) or inverse conversion (AC-DC conversion) at a necessary place. The various sensors 210 control an engine rotation speed or control an opening of a throttle valve (throttle opening) not illustrated through the vehicle control device 209. The various sensors 210 include a speed sensor, an acceleration sensor, an engine rotation speed sensor and the like.

A rotation force of the engine 201 is transmitted to the power generator 202 and it is possible to store the power generated by the power generator 202 by the rotation force in the battery 208.

When the hybrid vehicle decelerates by a braking mechanism not illustrated, a resistive force at the time of deceleration is applied to the power/drive force conversion device 203 as the rotation force and regenerative power generated by the power/drive force conversion device 203 by the rotation force is stored in the battery 208.

The battery 208 may also be connected to a power supply outside the hybrid vehicle to be supplied with the power from the external power supply through the charging inlet 211 as an inlet and store the received power.

Although not illustrated, this may also be provided with an information processing device, which performs the information processing regarding the vehicle control based on the information regarding the secondary battery. Such information processing device includes an information processing device, which displays a battery remaining amount based on information regarding the remaining amount of the battery, for example.

Meanwhile, an example of a series hybrid vehicle, which runs by the motor by using the power generated by the power generator operated by the engine or the power temporarily stored in the battery, is described above. However, this disclosure is effectively applicable also to a parallel hybrid vehicle, which appropriately switches three systems to run only by the engine, run only by the motor, and run by the engine and the motor, in which the outputs of the engine and the motor are drive sources. Further, this disclosure is effectively applicable also to the so-called electric vehicle, which runs by driving only by a drive motor without using the engine.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

MOD, MOD1 to MODN Storage module
ICNT Output controller
BS Bus interface
BT Battery unit
L1, L2 Power-supply line
11 Battery monitor
12 Switch circuit
21 Controller
22 Charge control switch
23 Discharge control switch
24 DC-DC converter
25 Control switch
27 Variable resistance
29 Comparator
30 Zener diode
42 Power supply
43 Load

The invention claimed is:

1. A storage system, comprising:
a storage unit capable of charging and discharging;
positive and negative terminals to which at least one of a power supply and a load is connected;
a positive power-supply line arranged between a positive electrode side of the storage unit and the positive terminal;
a negative power-supply line arranged between a negative electrode side of the storage unit and the negative terminal;
a discharge control switch device inserted into one of the positive power-supply line and the negative power-supply line;
a detecting unit that detects at least one of a voltage and a capacity of the storage unit;
a controller that controls the discharge control switch device based on detection information from the detecting unit;
a control power-supply unit connected to the positive and negative power-supply lines to supply power to the controller;
a comparing unit that is operated by a power-supply voltage and generates an output by comparing an input voltage corresponding to the positive and negative terminals with a reference voltage; and
a control switch connected to the negative power-supply line that turns off the control power-supply unit according to an instruction from the controller and turns on the control power-supply unit according to an instruction from the comparing unit, wherein
the controller turns off the discharge control switch device when the detecting unit detects that at least one of the voltage and the capacity of the storage unit is smaller than a predetermined value at the time of discharge when the discharge control switch device is turned on, and thereafter,
the controller turns off power to both the detecting unit and the control power-supply unit when the power supply is also lower than the predetermined value,
the control switch turns on the control power-supply unit according to the instruction from the comparing unit when the input voltage becomes larger than the reference voltage in an off-state in which the control power-supply unit and a detecting unit are under power-off state, and thereafter,
the control power-supply unit supplies power to the detecting unit that detects at least one of a voltage and a capacity of the storage unit.

2. The storage system according to claim 1, wherein a charge control switch device, which is turned on at the time of the charge, is inserted into a line into which the discharge control switch device is inserted, and
a voltage is supplied from a connecting point of the charge control switch device and the discharge control switch device to the control power-supply unit.

3. The storage system according to claim 1, wherein the number of storage devices of the storage unit is made changeable, and one of the input voltage of the comparing unit and the reference voltage is changeable according to the number of storage devices.

4. The storage system according to claim 1, wherein the power supply connected to the positive and negative terminals is a power generating device that generates power from renewable energy.

5. A storage system including the storage system according to claim 1, which supplies power to an electronic device connected to the storage system.

6. An electronic device supplied with power from the storage system according to claim 1.

7. An electric vehicle, comprising:
a conversion device that is supplied with power from the storage system according to claim 1 and converts the power to a drive force of the vehicle; and
a control device that performs information processing regarding vehicle control based on information regarding the storage system.

8. A power system, comprising:
a power information transmitting/receiving unit that transmits/receives a signal to/from another device through a network, wherein
the power system performs charge/discharge control of the storage system according to claim 1 based on information received by the transmitting/receiving unit.

9. A power system, which is supplied with power from the storage system according to claim 1 or supplies the power from a power generating device or a power network to the storage system.

10. The storage system according to claim 1, wherein a negative terminal of the control power-supply unit is connected to the negative power-supply line through the control switch.

11. The storage system according to claim 1, wherein the controller is configured to turn off power to the detection unit through a switch circuit in the storage unit.

12. The storage system according to claim 1, wherein a first voltage from the storage unit and a second voltage from the power supply is input to the control power-supply unit when the discharge control switch device is turn on.

* * * * *